Patented Sept. 28, 1937

2,094,359

UNITED STATES PATENT OFFICE 2,094,359

PREPARATION OF BASE-EXCHANGING SYNTHETIC RESIN

Willard H. Kirkpatrick, Chicago, Ill., assignor to National Aluminate Corporation, Chicago, Ill., a corporation of Delaware No Drawing. Application December 3, 1936, Serial No. 113,987

2 Claims. (Cl. 260—3)

The present invention relates to an improved method of producing a special type of resinous condensation product which has marked and valuable base exchanging properties.

One of the objects of the invention is to prepare a synthetic resin from a tannin and an aldehyde under such conditions as to produce the resin in the form in which it is particularly useful as a base exchanging material.

It has been found that certain types of resins produced from tannin and from aldehyde, when prepared under carefully controlled conditions as set forth hereinbelow, have very marked base exchange properties; in other words, they will readily remove cations. After the cation removing properties of these resins have become exhausted, they may very readily be regenerated and rendered fit for re-use by treatment with dilute acid, such for example as hydrochloric acid, with a concentration of from 0.5 up to 5%, preferably at the lower range.

The present invention is carried out as hereinbelow set forth, the example given being purely exemplary and not limiting.

The preparation of a suitable material for this purpose may be accomplished as follows:

50 parts by weight of what is known as crystalline quebracho tannin, which is a high grade tannin containing from 65% to 75% of actual tannin and is an unsulphited material, are dissolved in 500 parts by weight of water by vigorously stirring the solution to effect a complete mixture of the materials, the mixture being heated during the stirring to just short of the boiling point until complete solution of the tannin in the water has been secured. Thereupon 20 parts by weight of a 40% solution of formaldehyde are added to the mixture, which is contained in a suitable container provided with a reflux condenser, and the boiling continued for one hour, returning to the solution any of the water that might have escaped, so as to keep the material at constant volume. The resultant solution is then with great rapidity introduced into 30 parts by weight of concentrated hydrochloric acid, care being taken to effect such rapid stirring of the acid as to secure an almost immediate commingling of the materials. It is particularly important that this stirring be sufficiently violent to avoid the formation of local concentrations of material.

Almost immediately after the materials have thus been mixed, condensation will occur, with formation of resin, which causes the entire mixture to set into a relatively stiff gel. This gel is then allowed to cool, is mechanically broken up by any suitable means, and is then thoroughly washed with water for the purpose of removing excess soluble material. The gel may then be dried. In order to speed up the drying, it is within contemplation of the inventor to treat the gel after washing with alcohol, followed by ether, in order to remove the water therefrom. In any event the gel is dried by means of dry air at a temperature not exceeding 115° C.

When thus operating, there are obtained about 49 parts by weight of a very dark colored resin which corresponds to a yield of about 98% on the basis of the weight of the original tannin used for carrying out the process.

This resin may be used for purposes of effecting base exchange by using it in a particle size that will pass through a 28-mesh sieve but will be retained on a 42-mesh sieve. Smaller particles are undesirable, as they render the filtering operation too difficult, and particles much larger than this do not possess sufficient surface in proportion to the weight of the material to be commercially practicable, although of course the invention is not limited to the particle size of the resin when so used.

I claim:

1. The process of producing a base exchanging resin which comprises boiling a mixture consisting of a tannin and formaldehyde under a reflux condenser at constant volume for a period not substantially less than one hour and then rapidly introducing the resulting product into concentrated hydrochloric acid under such conditions as to assure very rapid and complete admixture, thereby forming a stiff gel, allowing the latter to cool, comminuting it, then washing excess reagents therefrom with water, and drying the gel.

2. The process of making a base exchanging resin which comprises dissolving 50 parts by weight of quebracho tannin in 500 parts by weight of water, adding 20 parts by weight of a 40% solution of formaldehyde, boiling the resultant mixture under a reflux condenser at constant volume for a period of not substantially less than one hour, introducing the resultant solution rapidly into 30 parts by weight of concentrated hydrochloric acid under conditions to insure rapid and complete admixture of the ingredients, thereby forming a gel, cooling the gel, comminuting the gel, washing it with water to remove excess soluble materials, and then drying the gel.

WILLARD H. KIRKPATRICK.